United States Patent [19]

Johnson

[11] Patent Number: 5,230,583
[45] Date of Patent: Jul. 27, 1993

[54] METHOD OF SEALING OPENINGS IN MANHOLE COVERS USING A PICK HOLE PLUG

[76] Inventor: Roy E. Johnson, 12308 Aegean St., Norwalk, Calif. 90650

[21] Appl. No.: 684,977

[22] Filed: Apr. 15, 1991

Related U.S. Application Data

[63] Continuation of Ser. No. 220,735, Jul. 18, 1988, abandoned.

[51] Int. Cl.⁵ .................. E02D 29/14; B65D 39/12
[52] U.S. Cl. ........................................ 404/25; 215/358
[58] Field of Search ............... 404/25, 26; 215/355, 215/358, 362

[56] References Cited

U.S. PATENT DOCUMENTS

| | | | |
|---|---|---|---|
| 781,182 | 1/1905 | Brewington | 215/362 |
| 1,014,450 | 1/1912 | Carlsson | 215/358 |
| 3,447,533 | 9/1964 | Spicer | 215/358 X |
| 4,188,457 | 2/1980 | Throp | 215/362 X |
| 4,597,692 | 1/1986 | Gruenwald | 404/25 |
| 4,726,469 | 2/1988 | Farber | 215/358 X |

FOREIGN PATENT DOCUMENTS 19854 10/1982 Fed. Rep. of Germany ...... 215/358

*Primary Examiner*—James R. Brittain
*Assistant Examiner*—Nancy P. Connolly
*Attorney, Agent, or Firm*—Edgar W. Averill, Jr.

[57] ABSTRACT

A pick hole plug for sealing an opening in a manhole cover and the process for using such plug. The plug is formed from a soft uncured rubber polymer which has a larger diameter than the hole which it is to seal. The plug is compressed by hand and inserted into the pick hole. The plug deforms to conform to the shape of the sides of the pick hole and cures over a period of time as the heat and sunlight contact it.

1 Claim, 1 Drawing Sheet

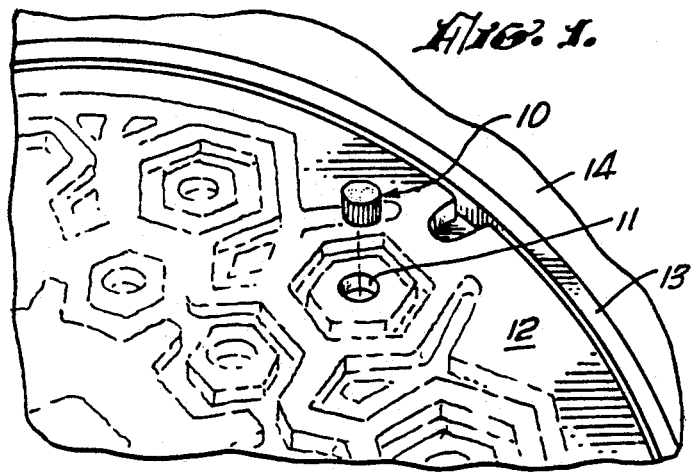
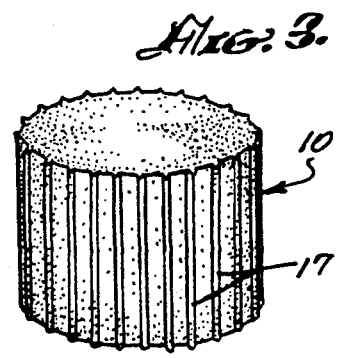
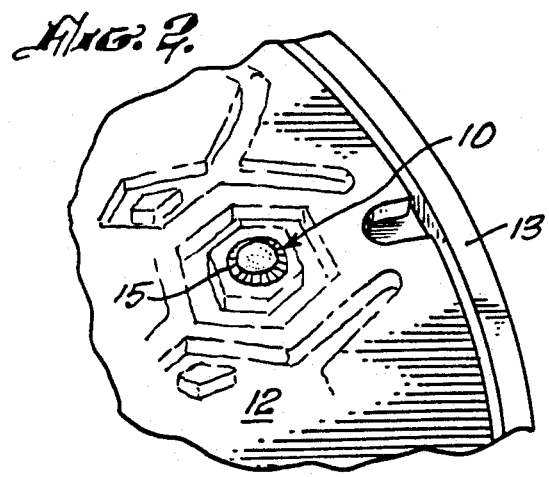
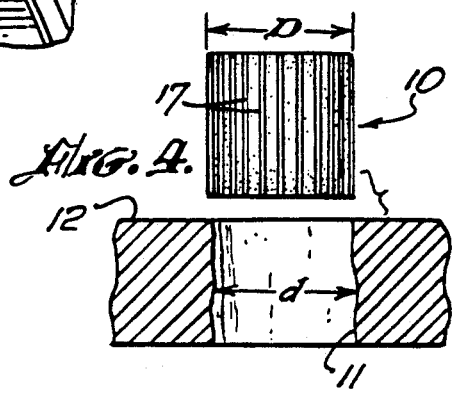
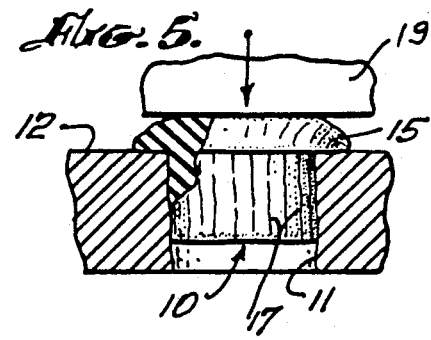
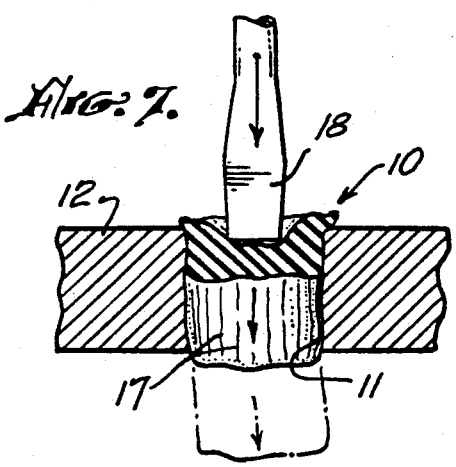
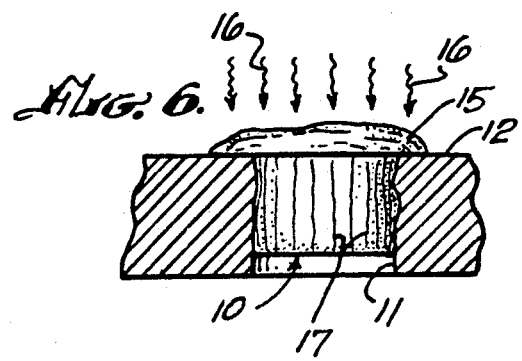

METHOD OF SEALING OPENINGS IN MANHOLE COVERS USING A PICK HOLE PLUG

This is a continuation of copending application(s) Ser. No. 07/220,735 filed on Jul. 18, 1988 now abandoned.

BACKGROUND OF THE DISCLOSURE

The field of the invention is utility apparatus, and the invention relates more particularly to manhole covers of the type used to permit access into electrical, telephone, sewer, and drainage lines and the like.

Manhole covers are invariably formed from cast iron because of its weight and strength. Such manhole covers must be equipped with some means for removing them from their frames, and this is most typically done by an opening through the manhole cover referred to as a pick hole. In order to remove the cover, an opening bar is inserted into the hole, and the upper end of the bar is pulled to provide sufficient leverage to lift the cover upwardly and permit it to be slid aside to permit entrance through the manhole.

For many installations, it is desirable to reduce the leakage of water, and other contaminants, through the manhole cover. For instance, for vaults used for containing electrical or telephonic equipment, water can be dangerous or harmful to the contents, and it is not uncommon for sufficient water to flow into a vault to make pumping the vault necessary before entrance can be possible. A major source of leakage through the manhole cover is the pick hole. Various attempts have been made to seal these openings, and hard plastic plugs have been used. Such plugs have proved unsatisfactory, however, particularly for manhole covers located in streets since the traffic tends to dislodge the plastic plugs from the hole Another disadvantage is ladies' high heels which can pass through the pick hole and provide a hazard. Another problem with sealing such holes is that since they are formed by a casting process, they are somewhat irregular in size and shape, and a close tolerance plug would not be satisfactory since hole sizes and shapes vary from cover to cover.

SUMMARY OF THE INVENTION

It is an object of the present invention to provide a plug for sealing pick holes in manhole covers.

It is another object of the present invention to provide a process for sealing pick holes in manhole covers.

The present invention is for a pick hole plug for sealing the pick hole opening in a manhole cover. The plug comprises a generally cylindrical, soft rubber plug formed from an uncured rubber compound. The process of the present invention includes the steps of forming an uncured elastomeric plug in a generally cylindrical shape, said generally cylindrical shape having an outside diameter slightly larger than the inside diameter of the hole to be sealed. Next, the plug is squeezed so that it may be inserted into the hole. The plug is then inserted into the hole and because of the memory inherent in elastomeric uncured rubber materials, the plug expands to seal the irregular inner surface of the pick hole plug. Preferably, the plug is inserted so that a portion of it extends above the surface of the hole and the upper portion is tamped down, preferably with the user's heel. As the plug remains in the pick hole, the heat from the sun tends to cure it into the desired unique shape for the particular hole into which it has been inserted. Preferably, the polymer contains EPDM and SBR polymers.

BRIEF DESCRIPTION OF THE DRAWINGS

FIG. 1 is a perspective view of a portion of the top of a manhole cover and showing the pick hole plug of the present invention above the pick hole of the manhole cover.

FIG. 2 is a perspective view of the pick hole plug inserted into pick hole of the manhole cover of FIG. 1.

FIG. 3 is an enlarged, perspective view of the pick hole plug of FIG. 1.

FIG. 4 side view of the pick hole plug and pick hole of FIG. 1.

FIG. 5 is a view analogous to FIG. 4 with the pick hole plug inserted into the pick hole.

FIG. 6 is a cross-sectional side view analogous to FIG. 5 showing the pick hole plug being cured by sunlight.

FIG. 7 is a side view analogous to FIGS. 5 and 6 showing the pick hole plug being removed by a screw driver.

DESCRIPTION OF THE PREFERRED EMBODIMENTS

The pick hole plug of the present invention is shown in perspective view in FIG. 1 and indicated by reference character 10. Pick hole plug 10 is shown above a pick hole 11 in a cast iron manhole cover 12. Manhole cover 12 sits in a cast iron frame 13 which is placed in the street surface 14. Such manhole covers are also commonly used in sidewalks, parking lots, alleys and other locations where underground utilities are located. The pick hole is used when the manhole cover is removed from the cast iron frame 13. An opening bar (not shown) has a tapered point which is inserted through pick hole 11. The bar is tapered sufficiently so that only the point of the bar passes through the pick hole. The upper end of the bar is then pulled, and the leverage is sufficient to lift the manhole cover which can then be turned and slid away from the manhole opening.

Most commonly, the pick holes, such as pick hole 11, are left open. This permits rain water, chemical spills and other undesirable materials to pass through the manhole cover. It was recently reported that on a rainy day as much as 250 million extra gallons of water can leak into the Los Angeles sewer systems which tax an already strained set of treatment facilities. There is, thus, a need to securely seal such pick holes. As can be seen in FIG. 4, the pick hole has an irregular shape since the manhole cover is cast iron and the hole is cast in the cover. For this reason, a perfectly cylindrical plug would not be satisfactory. The plug of the present invention is shown in enlarged, perspective view in FIG. 3 where it can be seen that it is generally cylindrical in shape and, preferably, has a plurality of outwardly extending ribs 17. The ribs 17 flatten out in use and help to assure that the plug will not fall through the pick hole. While such ribs are beneficial, they are not essential. The plug is formed from soft rubber which is uncured or partially uncured. As can be seen in FIG. 4, the diameter "D" of plug 10 is larger than the inside diameter "d" of the irregularly cast pick hole. In use, plug 10 is squeezed by hand to reduce its outside diameter temporarily and placed partially into hole 11. It is then, preferably, pressed downwardly so that the upper portion thereof forms a mushroom-like cap 15 shown in FIG. 5. A heel 19 is indicated in FIG. 5. The plug tends to expand shortly after it has been squeezed since it has a certain amount of memory and expands to tightly fit against the irregularly cast hole 11. As indicated in FIG. 6, heat, indicated by arrows 16, from the sun tends to cure the plug into its unique shape. In some locations, such as streets, the plug is further pushed into the hole by vehicular tires, and the cap 15 may not be formed and the plug has a dipped surface slightly below the surface of the manhole cover.

In order to remove the plug so that a bar may be inserted in the pick hole, the plug may be driven through the hole by a screw driver 18 or other object which is smaller than the pick hole. The plug can then be recovered and reused if desired. It also can be pried up like a cork in a bottle.

The particular rubber compound used is not especially critical. However, it has been found that a polymer containing EPDM provides excellent weather resistance and slow curing characteristics. The further addition to the compound of styrene butadiene rubber (SBR) is also useful as is the further addition of neoprene. Because of the uncured nature of the plug, there is no meaningful hardness, but the plug should be sufficiently soft so that it can be squeezed by hand and inserted into the hole. The plug should also be sufficiently hard so that it is somewhat difficult to squeeze it into shape so that it will not fall through the hole before it has been cured by the sunlight.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A method for removably sealing a pick hole in a manhole cover in a frame, without removing the manhole cover from its frame, which pick hole is a generally cylindrical opening with an irregular shape and an open bottom, said pick hole having a pick hole inside diameter, said method including the steps of:

forming a generally cylindrical plug from a solid, but soft rubber which is uncured or partially uncured, said plug having a plug outside diameter which is larger than the pick hole inside diameter;

squeezing the generally cylindrical plug to reduce its outside diameter temporarily to form a squeezed plug;

placing the squeezed plug partially into the pick hole;

pressing down on the top of the squeeze plug;

allowing the squeezed plug to relax and expand outwardly until it is retained by the pick hole along the sides of the pick hole but not retained at the top or the bottom after it has been placed partially into the pick hole; and allowing the plug to be exposed to the heat of the sun to cure the plug into a cured plug having the sides thereof in the unique shape of the pick hole, which cured plug may be removed by driving it through the hole.

* * * * *